United States Patent [19]

Corrado et al.

[11] 4,298,181
[45] Nov. 3, 1981

[54] ELECTRONIC ACTUATED BLEED VALVE

[75] Inventors: Anthony P. Corrado, Totowa; Vincent P. Marchese, Morris Township, Morris County, both of N.J.

[73] Assignee: EMX Controls, Inc., South Walpole, Mass.

[21] Appl. No.: 56,104

[22] Filed: Jul. 9, 1979

[51] Int. Cl.³ ............................................ F16K 31/02
[52] U.S. Cl. .............................. 251/129; 137/625.64; 251/30
[58] Field of Search ................ 137/625.64; 251/30, 251/129

[56] References Cited

U.S. PATENT DOCUMENTS

| | | | |
|---|---|---|---|
| 2,887,294 | 5/1959 | Hahn | 251/129 |
| 2,928,409 | 3/1960 | Johnson | 137/82 |
| 3,152,612 | 10/1964 | Avery | 251/141 X |
| 3,524,474 | 8/1970 | McCormick | 137/625.64 X |
| 3,583,443 | 6/1971 | Beckett | 137/625.63 |
| 3,618,636 | 11/1971 | Grimland | 137/625.6 |
| 3,712,339 | 1/1973 | Bartholomaus et al. | 137/625.62 |
| 3,804,120 | 4/1974 | Garnett | 137/625.64 |
| 4,195,811 | 4/1980 | Corrado et al. | 251/30 |

Primary Examiner—Gerald A. Michalsky
Attorney, Agent, or Firm—Salter & Michaelson

[57] ABSTRACT

A bleed valve assembly which includes a bleed valve seat having a bleed orifice partially defined thereby and a piezoelectric crystal mounted adjacent thereto so that upon bending of the crystal, as by energization thereof, pressure contact is made with an intermediate valve element. The valve element is in turn adapted to move against the bleed valve seat to close the same. When the bleed valve assembly is closed in the manner above described, pressure is permitted to build up in the orifice to modify the position of a main valve with which the bleed valve assembly is utilized. In addition the crystal is beam mounted within a bore in which the valve seat is positioned and essentially in contact with said bore solely at spaced peripheral edge positions thereof.

2 Claims, 6 Drawing Figures

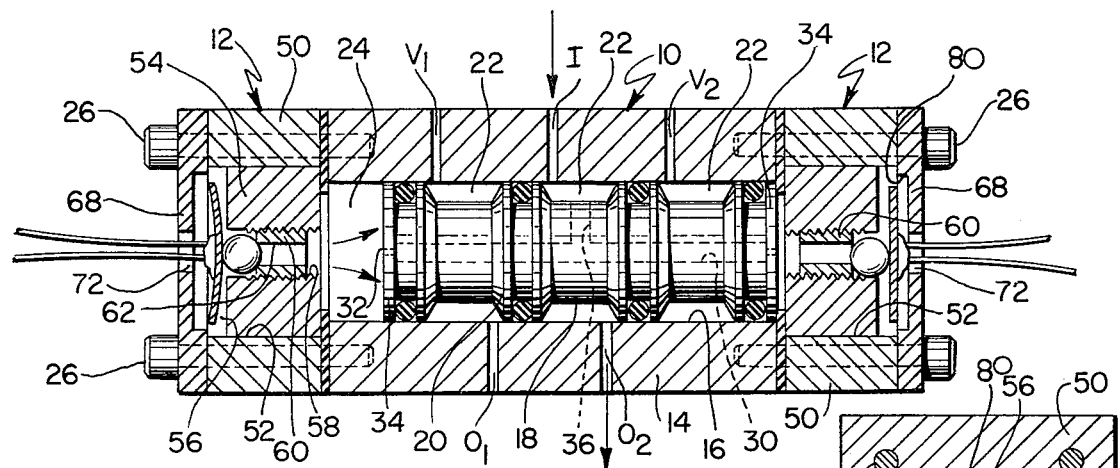
FIG. 1
FIG. 6
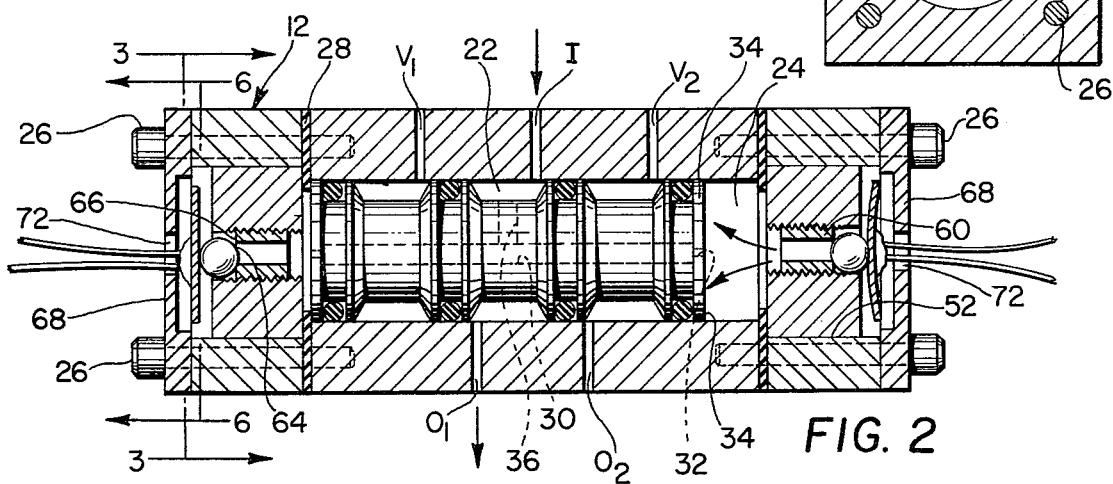
FIG. 2
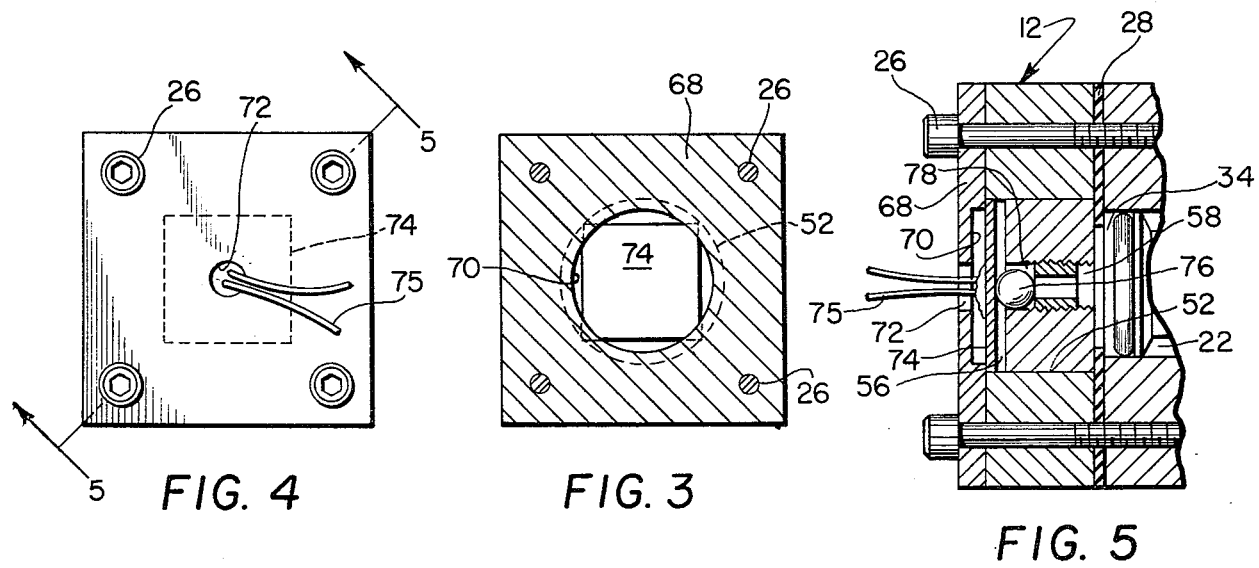
FIG. 4
FIG. 3
FIG. 5

ELECTRONIC ACTUATED BLEED VALVE

BACKGROUND OF THE INVENTION

This invention relates to electronic valves i.e., devices which generally convert DC power into pneumatic output signals so that fluid flow through such valves may be controlled. More particularly, the invention is concerned with a piezoelectric crystal actuated bleed valve assembly used in conjunction with such valves such that they may be operated at extremely low power output levels. Certain known crystalline materials exhibit a piezoelectric effect, that is, they expand upon energization, generally the application of electrical energy thereto. The power needed to effect such phenomena consumes extremely little electrical energy inasmuch as such piezoelectric crystals essentially operate as electrical capacitors and thus are almost totally voltage activated.

Suggested valve constructions of this general type are set forth in the following U.S. Pat. Nos. 3,029,743 issued Apr. 7, 1962; 3,524,474 issued Aug. 18, 1970; 3,981,480 issued Sept. 21, 1976; 2,651,326 issued Sept. 8, 1953 and 3,038,500 issued June 12, 1962. In U.S. Pat. No. 3,029,743 such a piezoelectric crystal is mounted in a cantilever position through an interconnected conical element to open and close a fluid orifice. In U.S. Pat. No. 3,524,474 an edge grip mounted piezoelectric crystal to which a valve member 44 is attached is utilized to directly close an orifice 18; while in U.S. Pat. No. 3,981,480 a piezoelectric element in sleeve form is utilized in direct contact with orifices 16 and 20 to restrict or permit fluid flow therebetween. The remaining cited patents are of general interest. The above citations and discussion of these patents constitutes applicant's prior art statement.

Notwithstanding the above prior art constructions, the need still exists for a reliable bleed valve assembly neccessitating low power usage and which may accordingly be operated by a self-contained power source such as a battery, solar cell or the like. It is therefore a primary object of the present invention to provide a bleed valve assembly in which a piezoelectric crystal is energized to move or bend in such a manner so as to force a separate valve element into sealing contact with a valve seat.

A further object of the invention is the provision of a valve of the aforementioned type in which various components thereof are interchangeable without affecting the operation thereof.

A still further object of the present invention is the provision of a bleed valve of the aforementioned type in which mazimum power may be achieved from the deflection of the piezoelectric crystal so as to effectively open and close a bleed orifice which in turn controls the operation of a main valve with which such bleed valve is coupled.

These and other objects of the present invention are achieved by the provision of a bleed valve having a housing, a valve seat mounted in said housing adjacent to and communicating with said bore, a fluid flow orifice terminating at said valve seat, a substantially planar piezoelectric crystal beam-mounted within said bore by contact with said bore solely at spaced peripheral edge portions thereof such that central portions thereof are free to move laterally with repect to said valve seat, a separate valve element disposed between said crystal and said valve seat, said element cooperatively supported in such position by mutual contact with said crystal and said valve seat, and means for energizing said crystal so as to laterally bend said central portions so as to move said element respectively into contact with and away from said valve seat to open and close said valve assembly.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention:

FIG. 1 is a vertical sectional view of a main spool valve permitting the flow of fluid therethrough in one of alternate attitudes and controlled by a pair of bleed valves FIG. 2 is a vertical side sectional view similar to FIG. 1 showing the main spool valve in an alternate operational mode;

FIG. 3 is a sectional view taken along the line 3—3 of FIG. 2;

FIG. 4 is an end view of the main valve shown in FIGS. 1 and 2;

FIG. 5 is a partially sectional view similar to FIGS. 1 and 2 but taken along a different plane, that of line 5—5 of FIG. 4; and FIG. 6 is a sectional view taken along the line 6—6 of FIG. 2.

DESCRIPTION OF THE INVENTION

Referring to the drawing and FIGS. 1 and 2 in particular, a spool valve 10 having a bleed valve assembly 12 mounted on opposite ends thereof is shown. The spool valve 10 is of conventional construction and includes a body 14 which defines a longitudinally extending bore 16 in which a movable valve member 18 is mounted for reciprocation between alternate use modes. The valve member 18 includes a number of longitudinally spaced piston and "O" ring assemblies 20 which in conjunction with the walls of the bore 16 serve to define a plurality of separate intermediate fluid chambers 22 and a pair of end chambers 24. In this regard, each of the bleed valve assemblies 12 is adapted for engagement against the outer faces of the spool valve 10 as by appropriately threaded bolts 26 and thus function to more fully enclose chamber 24. In addition, fluid seals or gaskets 28 may be utilized to insure that the connection between assemblies 12 and body 14 is appropriately fluid tight.

The movable valve member 18 is provided with a vent orifice in the form of an axial bore 30 opening at opposite ends thereof in a reduced diameter opening 32 within an end plate or piston 34 provided at each end thereof. In addition, a bore 36 connects with the orifice 30 and opens into the central intermediate chamber 22 such that fluid pressure may be present at all times in the chambers 24 at the opposite ends of the spool valve 10. Also, as will be hereinafter more fully explained such fluid pressure within the chambers 24 may vent through the normally open bleed valve assemblies 12 located at each end of the spool valve 10 such that increased pressure is not normally created in such end chambers.

The spool valve body 14 also includes a fluid inlet I on one side thereof and fluid outlets 0-1 and 0-2 on the opposite side thereof. In addition, vents V-1 and V-2 connect with those intermediate chambers 22 disposed on either side of the central chamber 22. The fluid outlets 0-1 and 0-2 are connected to a device or system (not shown) being controlled by the spool valve 10 such that one of the outlets 0-1 or 0-2 functions to permit fluid to enter the system and the other functions to permit fluid to escape (vent) therefrom. Thus in FIG. 1 the valve member 18 is shown in its right-hand position wherein fluid enters the valve through inlet I, into the centrally located intermediate chamber 22 and outwardly of the valve through outlet 0-2. In such position fluid passes into the spool valve controlled device or system from outlet 0-2 via inlet I and subsequently vents from the system through outlet 0-1 and vent V-1.

When, however, it is desired to shift the valve as to the left as shown in FIG. 2, the normally open bleed valve assembly 12 at the right-hand side is closed so that pressure builds up in the right-hand chamber 24 so as to slide the valve member 18 to the left, thus enabling fluid to move through the spool valve from inlet I to outlet 0-1. In such alternate position, fluid enters the controlled system through outlet 0-1 and is vented to atmosphere through outlet 0-2 and vent V-2.

In either of the above described alternate operative positions of the spool valve 10, the movable member 18 is stable unless pressure is allowed to build up in either of the end chambers 24 by closing either of the normally open bleed valve assemblies 12. Of course, once a shift is made, the bleed valve assembly 12 which was closed to permit pressure build up in one of the chambers 24 to cause a shift of the member 18 can be reopened to its normal open position without disturbing the stability of member 18.

As previously mentioned, the opposite ends of the bore 16 are closed by the positioning of bleed valve assemblies 12 against the outer faces of the valve body 14 by means of bolts 26. Each bleed valve assembly 12 includes a body section 50 provided with a central opening or bore 52. An insert 54 is positioned within the bore 52 and accordingly provides a shallow cylindrical chamber 56 at the forward end thereof. The insert is in turn provided with an axial threaded passageway 58. A plug member 60 having a bore 62 is threadably positioned within the passageway 58 and is provided at that end proximate and adjacent to chamber 24 with means (not shown) such as an Allenhead opening for longitudinally moving such plug 60 relative to the passageway 58 so as to provide for the adjustment thereof.

The other end of the plug 60 defines a valve seat 64. In this regard, the valve seat 64 is generally formed by drilling a sharp edged hole perpendicular to the front surface or face 66 of the plug 60. The shallow cylindrical chamber 56 formed at the forward end of the bore 62 by the insert 54 is partially closed by an endplate 68 secured thereto as by the bolts 26. The plate 68 is provided with a circular recess 70 of a diameter less than that of the chamber 56 and additionally with a central vent opening 72. A generally rectangular piezoelectric crystal 74 having opposed generally planar surfaces is disposed within the chamber 56 such that only the corners thereof contact the inner peripheral portions of the chamber 56. In this manner then the crystal 74 is essentially beam mounted with respect to the chamber 56 and thus is free for maximum lateral bending or deformation of the central unrestrained portions thereof when electrically activated. The crystal 74 is provided with energizing means such as the electrical wires 75 attached thereto in a known manner such as by conductive epoxy cement and which in turn pass through the vent opening 72 in the end plate 68.

Interposed between the valve seat 64 and the piezoelectric crystal 74 is a valve element 76 which is generally housed within a secondary chamber or pocket 78 formed at the forward portion of the passageway 58 which portion is generally of a smooth bore unthreaded configuration to prevent damage to the valve elements 76. The valve element 76 is generally of spherical shape such that it may contact the valve seat 64 in substantial line contact, thus transmitting a maximum amount of the force imparted thereto by the bending movement of the crystal 74 to thus effect a tight seal at the valve seat 64 and accordingly seal the bore 62 against the flow of fluid therethrough.

It may thus be seen that when the piezoelectric crystal 74 is activated so as to impart a lateral bending or deformation to the central unrestrained portion thereof, such bending is transmitted into a lateral movement of the valve element 76 against the valve seat 64. Such action closes the respective bleeder valve assembly 12 and thus will permit a build-up of fluid pressure within the adjacent end chamber 24, thus shifting the position of the main valve member 18 to an alternate use position. Normally, in the unactivated position of the piezoelectric crystal a portion of such fluid moving from the inlet I via connecting bore 36, through orifice 30 bleeds off to atmosphere through the open bore passage 62 and bleed opening 72 whereupon insufficient pressure is built up to shift the valve member 18.

The particular placement of the plug 60 within the passage 58 will affect the tightness of the seal between valve element 76 and valve seat 64 when the crystal 74 has been energized and also will determine the extent of bleed when the crystal is not energized. In order to insure that there is no slip or lateral movement of the plug 60 with respect to the passage 58, the threads mutually provided therein are of a very fine pitch. Alternatively, springs (not shown) could also be utilized to prevent any potential thread backlash. Normally, the activation impulse to the crystal 74 is in the form of an electrical voltage drop supplied from a DC battery source, although other sources of energy may be utilized, such as a solar cell or pulsed light. Thereafter the crystal bends and exerts a maximum lateral motion in the central portions thereof by reason of its beam support solely at spaced peripheral edge portions thereof. Such lateral motion is transmitted into a driving force to close the separate valve element 76 with respect to the valve seat 64. Inasmuch as the crystal, plug and valve element are separate from each other, other similar members may be interchanged therefore should they become worn or should different characteristics be desired. Also, by reason of the relatively loose poistioning of the crystal, it is free to exercise maximum bending or deformation, without having to overcome any resistance, such as would inherently exist if the edges of the crystal were held by gripping or clamping means. Expressed differently, the edges of crystal 74 are not gripped or clamped at all, but rather the crystal fits freely within bore 52 and only corner portions of relatively minor area when compared to the total area of the crystal and of a generally triangular configuration bear against the annular shoulder or edge 80 defined by recess 70. Thus there is little, if any, frictional resistance against deflection of the crystal when the latter is energized.

While there is shown and described herein certain specific structure embodying the invention, it will be manifest to those skilled in the art that various modifications or rearrangements of the parts may be made without departing from the spirit and scope of the underlying inventive concept and that the same is not limited to the particular forms herein shown and described except insofar as indicated by the scope of the appended claims.

What is claimed is:

1. A bleed valve assembly including a housing, a bore disposed in said housing, a valve seat mounted in said housing adjacent to and communicating with said bore, a fluid flow orifice terminating at said valve seat, a substantially planar piezoelectric crystal beam mounted within said bore by contact with said bore solely at spaced peripheral edge portions thereof such that central portions thereof are free to move laterally with respect to said valve seat, a separate valve element disposed between said crystal and said valve seat, said element cooperatively supported in such position by mutual contact with said crystal and said valve seat, means for energizing said crystal so as to laterally bend said central portions so as to move said element respectively into contact with and away from said valve seat to open and close said valve assembly, the planar perimetric configuration of said crystal differing from the cross-sectional configuration of said bore, said bore being cylindrical and said crystal being of generally rectangular configuration, and a ledge inwardly extending from said bore and in contact with planar face surface portions of said crystal opposite from that surface proximal said valve seat, said ledge being circular and said crystal being square, the diagonal dimensions of said crystal being just slightly less than that of the diameter of said bore, and the diameter of said circular ledge being just slightly greater than the length of one of the sides of said crystal, whereby only the corner portions of said crystal are supported by said ledge.

2. The valve assembly of claim 1, said ledge overlapping said crystal at the four corners thereof such that generally triangularly shaped corner portions each of a minor area when compared with that of the entire crystal contact said ledge are defined by such overlapping relationship.

* * * * *